(12) United States Patent
Takazane

(10) Patent No.: US 10,186,831 B2
(45) Date of Patent: Jan. 22, 2019

(54) LASER OSCILLATOR FOR IMPROVING BEAM QUALITY

(71) Applicant: FANUC CORPORATION, Minamitsuru-gun, Yamanashi (JP)

(72) Inventor: Tetsuhisa Takazane, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/868,796

(22) Filed: Sep. 29, 2015

(65) Prior Publication Data
US 2016/0094004 A1    Mar. 31, 2016

(30) Foreign Application Priority Data

Sep. 30, 2014   (JP) ................................ 2014-201661

(51) Int. Cl.
| | | |
|---|---|---|
| H01S 3/223 | (2006.01) | |
| H01S 3/08 | (2006.01) | |
| H01S 3/036 | (2006.01) | |
| H01S 3/032 | (2006.01) | |
| H01S 3/00 | (2006.01) | |

(52) U.S. Cl.
CPC ........ H01S 3/2232 (2013.01); H01S 3/08063 (2013.01); *H01S 3/0014* (2013.01); *H01S 3/032* (2013.01); *H01S 3/036* (2013.01)

(58) Field of Classification Search
CPC .... H01S 3/034; H01S 3/08018–3/0805; H01S 3/086; H01S 3/22–3/227; H01S 3/08059–3/08068; H01S 3/2232
See application file for complete search history.

(56) References Cited

U.S. PATENT DOCUMENTS

| | | | | | |
|---|---|---|---|---|---|
| 3,550,031 | A | * | 12/1970 | Buchsbaum | .......... H01S 3/1109 331/107 G |
| 4,477,909 | A | * | 10/1984 | Salvi | ................... H01S 3/08081 372/103 |
| 4,942,588 | A | * | 7/1990 | Yasui | ...................... H01S 3/034 372/103 |
| 5,506,858 | A | * | 4/1996 | Takenaka | ............... B23K 26/06 372/108 |

(Continued)

FOREIGN PATENT DOCUMENTS

| | | |
|---|---|---|
| CN | 103098318 A | 5/2013 |
| JP | 60217678 | 10/1985 |

(Continued)

OTHER PUBLICATIONS

Japanese Office Action dated Jan. 5, 2016 for Japanese Application No. 2014-201661, including partial translation.

*Primary Examiner* — Jessica S Manno
*Assistant Examiner* — Sean P Hagan
(74) *Attorney, Agent, or Firm* — RatnerPrestia

(57) ABSTRACT

A laser oscillator includes a discharge tube having a discharge area in which laser gas is excited and an output coupler and a rear mirror respectively arranged at both sides of the discharge tube. A first coating material having first reflectance is stacked as a dielectric multilayer on a first area including a radial center portion of a surface of the output coupler, which faces the discharge area, and a second coating material having second reflectance higher than the first reflectance is stacked as a dielectric multilayer on a second area around the first area.

3 Claims, 3 Drawing Sheets

(56) References Cited

U.S. PATENT DOCUMENTS

| | | | |
|---|---|---|---|
| 6,370,178 B1* | 4/2002 | Papayoanou | H01S 3/0315 372/107 |
| 2002/0024978 A1* | 2/2002 | Inagaki | H01S 3/10092 372/20 |
| 2004/0161012 A1* | 8/2004 | Kumazaki | H01S 3/08009 372/92 |
| 2008/0043799 A1* | 2/2008 | Egawa | H01S 3/036 372/59 |
| 2013/0121355 A1 | 5/2013 | Miyamoto et al. | |

FOREIGN PATENT DOCUMENTS

| | | |
|---|---|---|
| JP | 2-166778 | 6/1990 |
| JP | 06188491 | 7/1994 |
| JP | 08191166 | 7/1996 |
| JP | 3313623 A | 8/2002 |
| JP | 2005158995 | 6/2005 |
| JP | 2009-94161 A | 4/2009 |
| JP | 2013-247260 A | 12/2013 |
| WO | 2009083990 | 7/2009 |
| WO | 2014111626 | 7/2014 |

* cited by examiner

LASER OSCILLATOR FOR IMPROVING BEAM QUALITY

BACKGROUND OF THE INVENTION

1. Field of the Invention

The present invention relates to a laser oscillator which excites laser gas by a discharge tube to oscillate a laser beam.

2. Description of the Related Art

In general, the quality (light focusing property) of a laser beam output from a laser oscillator is improved as a mode order is lowered. In this regard, there has been known a laser oscillator configured to restrain laser oscillation of a high order mode and allow laser oscillation to occur in a low order mode. Such a laser oscillator, for example, is disclosed in Patent Registration No. 3313623, Japanese Laid-open Patent Publication No. 2013-247260, and Japanese Laid-open Patent Publication No. 2009-94161. In the laser oscillators disclosed in these Patent Literatures, an aperture is arranged between an output coupler and a rear mirror. In the laser oscillators, the diameter of laser beam is limited by the aperture, and therefore laser oscillation of a high order mode is restrained and the generation of scattered light is suppressed.

However, since the laser oscillators disclosed in the aforementioned Patent Literatures have an aperture, their configurations are complicated and the aperture absorbs a laser beam, resulting in the deterioration of laser output.

In contrast, Japanese Laid-open Patent Publication No. 2-166778 discloses a laser oscillator configured to perform coating on the surfaces of an output coupler and a rear mirror to oscillate only a laser beam of a low order mode. In this laser oscillator, a semi-transmissive film is coated on a radial center portion of the output coupler and a non-reflective film is coated at a peripheral portion thereof. However, in this laser oscillator, since the non-reflective film is coated at the peripheral portion of the output coupler, it is difficult to suppress the generation of scattered light.

SUMMARY OF INVENTION

A laser oscillator according to one aspect of the present invention comprises a discharge tube having a discharge area in which laser gas is excited and an output coupler and a rear mirror respectively arranged at both sides of the discharge tube. A first coating material having first reflectance is stacked on a first area including a radial center portion of a surface of the output coupler, which faces the discharge area, and a second coating material having second reflectance higher than the first reflectance is stacked on a second area around the first area.

BRIEF DESCRIPTION OF THE DRAWINGS

The object, features, and advantages of the present invention will be further apparent from a description of the following embodiment associated with the accompanying drawings, and in the accompanying drawings.

DETAILED DESCRIPTION

Figure 1:
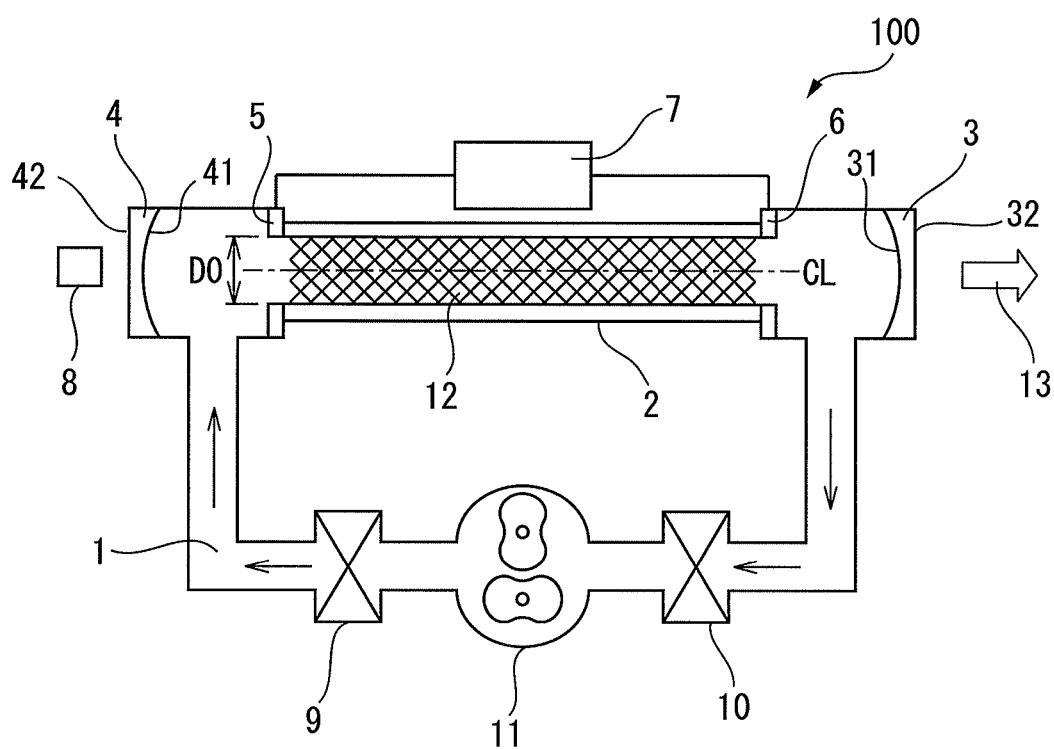
FIG. 1 is a diagram illustrating an entire configuration of a laser oscillator according to an embodiment of the present invention.

Hereinafter, with reference to FIG. 1 to FIG. 6, an embodiment of a laser oscillator 100 according to the present invention will be described. FIG. 1 is a diagram illustrating an entire configuration of the laser oscillator 100 according to an embodiment of the present invention. The laser oscillator 100 according to the present embodiment is a high output carbon dioxide laser oscillator which employs laser gas as a medium and excites the laser gas by a discharge tube.

As illustrated in FIG. 1, the laser oscillator 100 includes a gas passage 1 through which laser gas circulates, a discharge tube 2 which communicates with the gas passage 1, an output coupler 3 and a rear mirror 4 arranged at both sides of the discharge tube 2 so as to interpose the discharge tube 2 therebetween, a power supply unit 7 which applies a voltage (a discharge tube voltage) to electrodes 5 and 6 of the discharge tube 2, a sensor 8 which detects laser output, heat exchangers 9 and 10 which cool the laser gas, and a ventilator 11 which circulates the laser gas along the gas passage 1 as indicated by an arrow.

The discharge tube 2 has a cylindrical shape having a circular sectional shape. An axial line CL of the discharge tube 2 passes through the center of a circle having a circular sectional shape. The axial line CL extends in a longitudinal direction of the discharge tube 2. The discharge tube 2 has a discharge area 12 therein. A planar shape of the output coupler 3 is a circular shape around the axial line CL. In addition, a planar shape of the rear mirror 4 is a circular shape around the axial line CL. Outer diameters of circles of the output coupler 3 and the rear mirror 4 having the planar shapes are larger than an inner diameter D0 of the discharge tube 2. The output coupler 3 has a first surface 31 facing the discharge area 12 and a second surface 32 opposite to the first surface 31, and the rear mirror 4 has a first surface 41 facing the discharge area and second surface 42 opposite to the first surface 41. Each of the first surface 31 of the output coupler 3 and the first surface 41 of the rear mirror 4 is formed in a concave shape and has a predetermined curvature radius. The second surface 32 of the output coupler 3 is a convex surface having a predetermined curvature radius or a flat surface, and the second surface 42 of the rear mirror 4 is a flat surface.

In such a laser oscillator 100, when electric power is supplied to each of the electrodes 5 and 6 of the discharge tube 2, i.e., when the discharge tube voltage is applied, discharge of laser gas is started in the discharge area 12 of the discharge tube 2. By this discharge start, the laser gas is excited to generate light. Resonance occurs between the output coupler 3 and the rear mirror 4, and therefore the light is amplified by stimulated emission. A part of the amplified light is emitted from the output coupler 3 as laser beam 13. The taken-out laser beam 13, for example, is output to a laser processing machine which is not shown in the figures and performs cutting and the like of a work.

In this case, the degree of beam quality (light focusing property) of the laser beam 13 and the degree of scattered light have an influence on the cutting capacity and cutting quality of the work. When the beam quality is low, if a laser beam has been collected in a laser processing condensing lens, a condensing diameter is not sufficiently small, and therefore stable laser processing is not possible due to short Rayleigh length and the like, resulting in the deterioration and instability of cutting capacity. On the other hand, when many scattered light components are included in the laser beam, if the laser beam is collected in the laser processing condensing lens, the scattered light components are collected in a distance different from that of main components and are spread on the work. As a consequence, unexpected heating may occur in the work, resulting in an adverse influence on the quality of a cutting plane of the work.

In order to improve beam quality, it is effective to employ a configuration of restraining laser oscillation of a high order mode and perform laser oscillation only in a lower order mode. In this regard, for example, it is possible to employ a configuration of arranging an aperture between the output coupler 3 and the rear mirror 4 and limiting a diameter of laser beam by the aperture. However, in this configuration, the number of members increases which complicates the configuration and the aperture absorbs laser beam, resulting in the reduction of laser output. On the other hand, in the case of employing a configuration in which a semi-transmissive film is coated on a radial center portion of the first surface 31 of the output coupler 3 and a non-reflective film is coated at a peripheral portion thereof, it is difficult to suppress the generation of scattered light. Therefore, in the present embodiment, in order to improve beam quality and to suppress the generation of scattered light, coating is performed on the first surface 31 of the output coupler 3 and the first surface 41 of the rear mirror 4 as described below.

Figure 2:
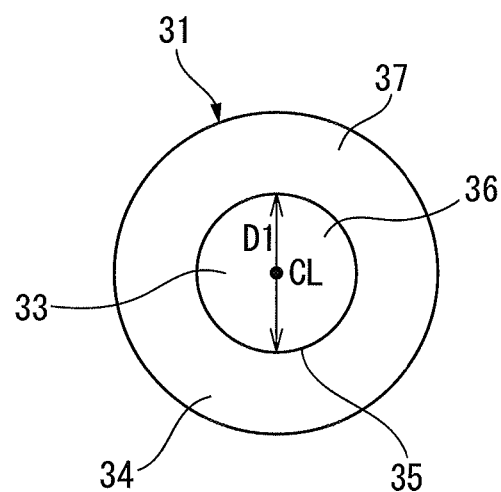
FIG. 2 is a front view of a first surface of an output coupler of FIG. 1.

FIG. 2 is a front view of the first surface 31 of the output coupler 3 according to the present embodiment. The first surface 31 is divided into a first area 33 having a circular shape around the axial line CL and a second area 34 having a ring shape outside the first area 33. A diameter D1 of a circular boundary line 35 between the first area 33 and the second area 34, for example, is 90% or more and 100% or less of an inner diameter D0 of the discharge tube 2. On the first area 33 and the second area 34, coating materials having different reflectances are stacked as dielectric multilayers. In other words, on the first area 33, a first coating material 36 having predetermined reflectance $\alpha 1$ is stacked as a dielectric multilayer, and on the second area 34, a second coating material 37 having predetermined reflectance $\alpha 2$ higher than the reflectance $\alpha 1$ of the first coating material 36 is stacked as a dielectric multilayer. As the coating materials 36 and 37, for example, it is possible to use a dielectric multilayer such as zinc selenium and thorium fluoride (ZnSe and ThF).

The first coating material 36 has the reflectance $\alpha 1$ which is appropriate for laser oscillation. The reflectance $\alpha 1$ is selected from the range of 20% or more and 70% or less according to the configuration of the laser oscillator 100. For example, a gain becomes large when the number of discharge tubes 2 is large, the entire length of the discharge tube 2 is long, medium density is high, a resonator length is long and the like. Therefore, the first coating material 36 having small reflectance $\alpha 1$ (for example, 20%) is used. On the other hand, a gain becomes small when the number of discharge tubes 2 is small, the entire length of the discharge tube 2 is short, the medium density is low, the resonator length is short and the like. Therefore, the first coating material 36 having large reflectance $\alpha 1$ (for example, 70%) is used. In contrast, the second coating material 37 is a total reflective coating material and has high reflectance $\alpha 2$ (for example, reflectance of 90% or more, preferably, reflectance of 99% or more).

As described above, the first coating material 36 having the reflectance $\alpha 1$ of 20% or more and 70% or less is coated, as a dielectric multilayer, on an inner area of the first surface 31 of the output coupler 3, which has a diameter corresponding to 90% or more and 100% or less of the inner diameter D0 of the discharge tube 2, and therefore laser oscillation of a high order mode is suppressed. Furthermore, laser oscillation can be allowed to occur in a low order mode, and therefore it is possible to improve beam quality. In addition, total reflective coating is performed around the first coating material 36 by the second coating material 37, and therefore it is possible to prevent transmission of scattered light to an exterior and to allow the scattered light to be reflected from the second coating material 37 so as to be introduced to the discharge area 12, resulting in the restraint of reduction of the output of laser beam.

Figure 3:
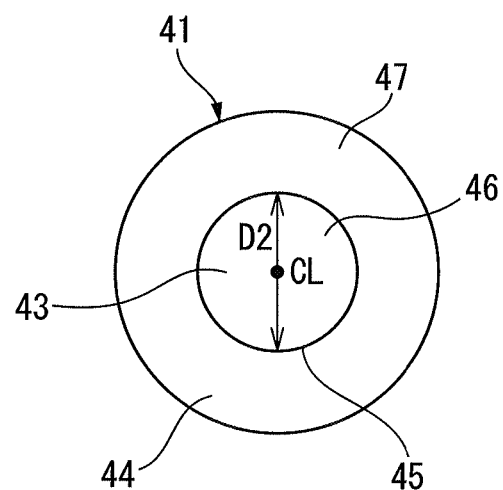
FIG. 3 is a front view of a first surface of a rear mirror of FIG. 1.

FIG. 3 is a front view of the first surface 41 of the rear mirror 4 according to the present embodiment. The first surface 41 is divided into a first area 43 having a circular shape around the axial line CL and a second area 44 having a ring shape outside the first area 43. A diameter D2 of a circular boundary line 45 between the first area 43 and the second area 44, for example, is 90% or more and 100% or less of the inner diameter D0 of the discharge tube 2. On the first area 43 and the second area 44, coating materials having different reflectances are stacked as dielectric multilayers. In other words, on the first area 43, a third coating material 46 having predetermined reflectance $\alpha 3$ is stacked as a dielectric multilayer. On the second area 44, a fourth coating material 47 having predetermined reflectance $\alpha 4$ lower than the reflectance $\alpha 3$ of the third coating material 46 is stacked as a dielectric multilayer. As the coating materials 46 and 47, for example, it is possible to use a multilayer such as zinc selenium and thorium fluoride (ZnSe and ThF).

The third coating material 46, for example, is a high reflective coating material and its reflectance $\alpha 3$, for example, is 99.0% or more and 99.9% or less. The fourth coating material 47, for example, is a non-reflective coating material and its reflectance $\alpha 4$, for example, is almost 0.

As described above, high reflective coating is performed on an inner area of the first surface 41 of the rear mirror 4, which has a diameter corresponding to 90% or more and 100% or less of the inner diameter D0 of the discharge tube 2, by using the third coating material 46, and non-reflective coating is performed around the third coating material 46 by using the fourth coating material 47. By this configuration, it is possible to suppress laser oscillation of a high order mode and improve oscillation efficiency of a low order mode.

Figure 4:
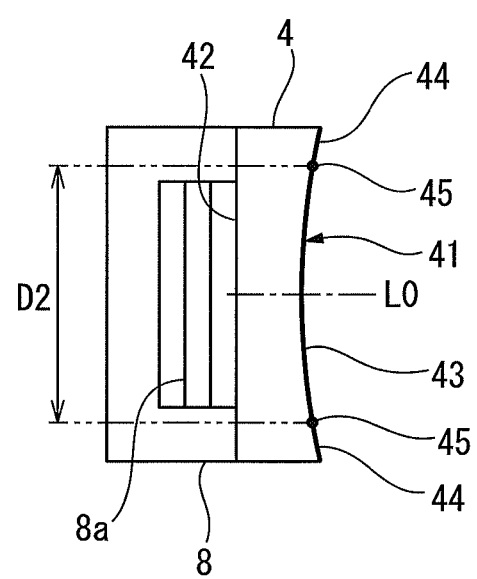
FIG. 4 is a sectional view of main elements of FIG. 1, which illustrates a positional relation of a rear mirror and a sensor.

FIG. 4 is a sectional view illustrating a positional relation of the rear mirror 4 and the sensor 8. As illustrated in FIG. 4, the sensor 8 which detects laser beam has a light receiving unit 8a. The light receiving unit 8a serves as a detection unit. The light receiving unit 8a is arranged so as to face the second surface 42 of the rear mirror 4. The maximum outer diameter of the light receiving unit 8a is smaller than a diameter D2 of the boundary line 45, and the light receiving unit 8a is arranged such that a center portion is positioned on the axial line CL, and therefore the light receiving unit 8a is prevented from protruding from an extension line (a two dot chain line) of the boundary line 45 parallel to the axial line CL.

As described above, the light receiving unit 8a of the sensor 8 is arranged so as to face the second surface 42 of the rear mirror 4 and arranged radially inside the boundary line 45, and therefore it is possible to prevent laser beam having passed through the second area 44 (the non-reflective coating) from being incident into the light receiving unit 8*a*. As a consequence, it is possible to prevent burning of the sensor 8, and therefore it is possible to measure stable laser output.

According to the aforementioned embodiment, the following operations and effects can be obtained.

(1) On the first area 33 including the radial center portion of the first surface 31 of the output coupler 3 of the laser oscillator 100, the first coating material 36 having the reflectance $\alpha 1$ is stacked as a dielectric multilayer. On the second area 34 around the first area 33, the second coating material 37 having the reflectance $\alpha 2$ higher than the reflectance $\alpha 1$ is stacked as a dielectric multilayer. As described above, the first coating material 36 of low reflection is stacked on the center portion of the output coupler 3 as a dielectric multilayer, and therefore laser oscillation occurs only in a low order mode and thus it is possible to improve beam quality. In addition, the second coating material 37 of high reflection is provided at an outer peripheral side, and therefore it is possible to prevent discharge of scattered light generated in the laser oscillator 100 to an exterior, resulting in the improvement of processing quality. In addition, the scattered light is reflected by the second coating material 37 and returns into the discharge area 12, and therefore it is possible to restrain the reduction of laser output. In other words, by a configuration in which no aperture is used, it is possible to improve beam quality and suppress the generation of the scattered light.

In addition, two types of coating materials 36 and 37 are only stacked on the first surface 31 as dielectric multilayers, and therefore there is no increase in the number of member and it is possible to easily configure the laser oscillator 100 at low cost. In contrast, for example, when separate members having different reflectances are arranged at the first area 33 and the second area 34, since the number of member increases to complicate a configuration, the cost of the laser oscillator 100 also increases.

(2) The boundary line 35 between the first area 33 and the second area 34 of the output coupler 3 is positioned on a circle around the axial line CL of the discharge tube 2, and the diameter D1 of the circle is 90% or more and 100% or less of the inner diameter D0 of the discharge tube 2. As described above, the boundary line 35 is set on the circle concentric to the discharge tube 2 in the range of 90% or more and 100% or less of the inner diameter D0 of the discharge tube 2, and therefore it is possible to improve balance of beam quality and laser output. On the other hand, for example, when the diameter D1 of the boundary line 35 becomes less than 90% of the inner diameter D0 of the discharge tube 2, oscillation of a high order mode is not possible, resulting in the improvement of beam quality. On the other hand, laser beam is allowed to be reflected by the second coating material 37 and to return into the discharge area 12, but since loss of laser output becomes large, reduction of the output of laser beam becomes problematic.

(3) On the first area 43 including the radial center portion of the first surface 41 of the rear mirror 4 of the laser oscillator 100, the third coating material 46 having the reflectance $\alpha 3$ is stacked as a dielectric multilayer, and on the second area 44 around the first area 43, the fourth coating material 47 having the reflectance $\alpha 4$ lower than the reflectance $\alpha 3$ is stacked as a dielectric multilayer. For example, high reflective coating is performed at the center side of the first surface 41 of the rear mirror 4, and non-reflective coating is performed at an outer peripheral side. By adopting this configuration, it is possible to suppress oscillation of a high order mode, and therefore it is possible to improve beam quality.

(4) The boundary line 45 between the first area 43 and the second area 44 of the rear mirror 4 is positioned on a circle around the axial line CL of the discharge tube 2, and the diameter D2 of the circle is 90% or more and 100% or less of the inner diameter D0 of the discharge tube 2. By adopting this configuration, it is possible to improve balance of beam quality and laser output.

(5) The light receiving unit 8*a* of the sensor 8 which detects laser output is arranged to be positioned radially inside the boundary line 45 between the first area 43 and the second area 44 while facing the second surface 42 of the rear mirror 4. By adopting this configuration, it is possible to prevent laser beam having passed through the second area 44 from being incident into the light receiving unit 8*a*, and therefore it is possible to prevent an abnormal operation and malfunction of the sensor 8.

Figure 5:
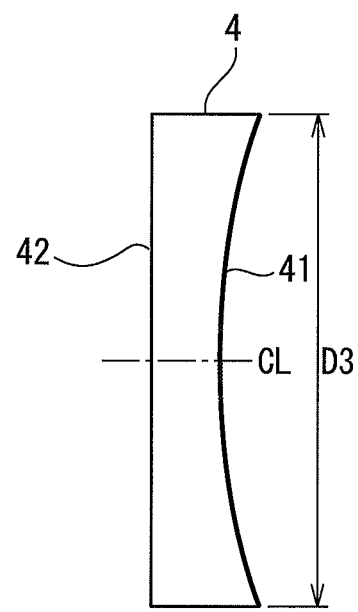
FIG. 5 is a diagram illustrating a modification of FIG. 3.

Moreover, in the aforementioned embodiment (FIG. 3), the first surface 41 of the rear mirror 4 is divided into the first area 43 and the second area 44 and a high reflective coating material is stacked on the first area 43 as a dielectric multilayer; however, the rear mirror 4, for example, can be configured as follows. FIG. 5 is a sectional view of the rear mirror 4, which is a modification of FIG. 3. As illustrated in FIG. 5, the rear mirror 4 has a circular shape around the axial line CL and its outer diameter D3 is 90% or more and 100% or less of the inner diameter D0 of the discharge tube 2. On the first surface 41 of the rear mirror 4, a coating material having the same reflectance, i.e. a total reflective coating material is stacked over the whole area as a dielectric multilayer.

By adopting this configuration, laser oscillation of a high order mode is suppressed and it is possible to improve beam quality. In addition, the rear mirror 4 and the discharge tube 2 are concentrically arranged, and therefore it is possible to improve both beam quality and laser output with good balance. The high reflective coating material is stacked over the whole area of the first surface 41 as a dielectric multilayer, and therefore coating work is facilitated as compared with when the first surface 41 is divided into two areas 43 and 44 and separate coating materials having reflectances are stacked as dielectric multilayers.

Figure 6:
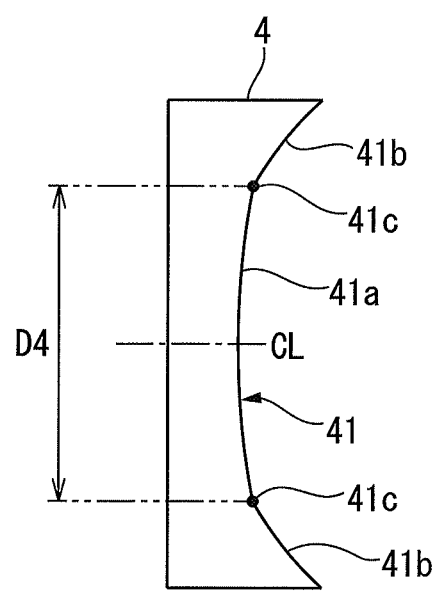
FIG. 6 is a diagram illustrating another modification of FIG. 3.

FIG. 6 is a diagram illustrating another modification of FIG. 3. The planar shape of the rear mirror 4 is a circular shape around the axial line CL. The first surface 41 has a first concave part 41*a* formed in a first area including a radial center portion and having a first curvature radius r1 and a second concave part 41*b* formed in a second area around the first area and having a second curvature radius r2 smaller than the first curvature radius r1. The first curvature radius r1, for example, is 100 m and the second curvature radius r2, for example, is 50 m. A boundary line 41*c* between the first concave part 41*a* and the second concave part 41*b* has a circular shape around the axial line CL, and its diameter D4 is 90% or more and 100% or less of the inner diameter D0 of the discharge tube 2.

As described above, since the first concave part 41*a* of the first curvature radius r1 and the second concave part 41*b* of the second curvature radius r2 (<r1) are formed in the first surface 41 of the rear mirror 4, the center side of the rear mirror 4 has a curvature appropriate for laser oscillation and laser oscillation of a low order mode is promoted. In addition, laser beam is reflected to the center side of the discharge tube 2 by the second concave part 41*b* having a small curvature, and therefore it is possible to suppress laser oscillation of a high order mode and to restrain the reduction of laser output. Moreover, a high reflective coating material can also be stacked over the whole area of the first surface 41 as a dielectric multilayer, and the first concave part 41a and the second concave part 41b can also be respectively regarded as the first area 43 and the second area 44 of FIG. 3 and coating materials 46 and 47 having different reflectances can also be stacked as dielectric multilayers.

Moreover, in the aforementioned embodiment, the single discharge tube 2 is provided in the laser oscillator 100 (FIG. 1), however, a plurality of discharge tubes 2 may also be provided. The arrangements and configurations of the output coupler 3 and the rear mirror 4 are not limited to the aforementioned arrangements and configurations as long as they are arranged at both sides of the discharge tube 2. For example, at least one of the first surface 31 of the output coupler 3 and the first surface 41 of the rear mirror 4 may be formed to be flat other than a concave shape. If the first coating material 36 having the reflectance α1 (first reflectance) is stacked as a dielectric multilayer on the first area 33 including the radial center portion of a surface (the first surface 31) of the output coupler 3, which faces the discharge tube 2, and the second coating material 37 having the reflectance α2 (second reflectance) higher than the first reflectance α1 is stacked on the second area 34 around the first area 33 as a dielectric multilayer, there is no any limitation in the configuration of coating performed on the first surface 31. For example, a diameter of the boundary line 35 between the first area 33 and the second area 34 may also be smaller than 90% or larger than 100% of the inner diameter D0 of the discharge tube 2.

When 2-division coating is performed on a surface (the first surface 41) of the rear mirror 4, which faces the discharge area 12 (FIG. 3), if the third coating material 46 having the reflectance α3 (third reflectance) is stacked on the first area 43 including the radial center portion as a dielectric multilayer and the fourth coating material 47 having the reflectance α4 (fourth reflectance) lower than the third reflectance α3 is stacked on the second area 44 around the first area 43 as a dielectric multilayer, there is no any limitation in the configuration of coating performed on the first surface 41. For example, a diameter of the boundary line 45 between the first area 43 and the second area 44 may also be smaller than 90% or larger than 100% of the inner diameter D0 of the discharge tube 2. In the aforementioned embodiment (FIG. 4), the light receiving unit 8a of the sensor 8 is arranged so as to face the second surface 42 of the rear mirror 4, however, if the light receiving unit 8a is arranged to be positioned radially inside the boundary line 45, the arrangement of the detection unit which detects laser output is not limited to the aforementioned arrangement.

As a method for coating a coating material on the output coupler and the rear mirror, the method for stacking zinc selenium, thorium fluoride and the like as a dielectric multilayer has been exemplified, however, coatings having various reflectances can also be generated on the output coupler and the rear mirror by another method and the like for coating gold and copper.

According to the present invention, the first coating material having the first reflectance is stacked on the first area of the surface of the output coupler and the second coating material having the second reflectance higher than the first reflectance is stacked on the second area around the first area, and therefore it is possible to improve beam quality and suppress the generation of scattered light by a simple configuration using no aperture.

The above description is merely an example, and the present invention is not limited to the aforementioned embodiments and modifications as long as they do not impair the features of the present invention. Elements of the embodiments and the modifications include elements which can be replaced and are apparently replaced while maintaining the identification of the present invention. In other words, other embodiments considered within the technical scope of the present invention are included in the scope of the present invention. In addition, two or more of the embodiments and the modifications can also be arbitrarily combined.

The invention claimed is:

1. A laser oscillator comprising:
   a discharge tube having a discharge area in which laser gas is excited;
   an output coupler arranged on a first side of the discharge tube, the output coupler including:
      a) a first coating material having a first reflectance between 20%-70% stacked on a first area including a radial center portion of a surface of the output coupler, the first area facing the discharge area, and
      b) a second coating material having a second reflectance higher than the first reflectance is stacked on a second area of the output coupler around the first area;
   a rear mirror having a front side facing the discharge area and a back side opposite the front side, the rear mirror arranged on a second side of the discharge tube, the rear mirror including:
      c) a third coating material stacked on a third area including a radial center portion of a surface of the front side of the rear mirror, the third coating material having a third reflectance, and
      d) a fourth coating material stacked on a fourth area of front side of the rear mirror around the third area, the fourth coating material having a fourth reflectance of substantially zero; and
   a light detecting sensor arranged on the back side of the rear mirror within the third area exclusive of the fourth area,
   wherein a boundary line between the first area and the second area of the output coupler is positioned on a circle around an axial line passing through a center of the discharge tube, and a diameter of the circle is 90% or more and 100% or less of an inner diameter of the discharge tube, and
   wherein a boundary line between the third area and the fourth area of the rear mirror is positioned on a circle around an axial line passing through a center of the discharge tube, and a diameter of the circle is 90% or more and 100% or less of an inner diameter of the discharge tube.

2. The laser oscillator according to claim 1, wherein a planar shape of the rear mirror is formed in a circular shape around an axial line passing through a center of the discharge tube, an outer diameter of the circle having the planar shape is 90% or more and 100% or less of the inner diameter of the discharge tube.

3. The laser oscillator according to claim 1, wherein the rear mirror has a planar shape which is formed in a circular shape around an axial line passing through a center of the discharge tube, and has a first concave part formed in a first area including a radial center portion of a surface facing the discharge area and having a first curvature radius and a second concave part formed in a second area around the first area and having a second curvature radius smaller than the first curvature radius.

\* \* \* \* \*